United States Patent Office 3,657,434
Patented Apr. 18, 1972

3,657,434
21-(TETRAHALOCYCLOBUTYL CARBOXYLIC ACID) STEROID ESTERS
Kurt Radscheit, Kelkheim, Taunus, Werner Fritsch, Neuenhain, Taunus, and Werner Haede, Ulrich Stache, and Hans-Georg Schröder, Hofheim, Taunus, Germany, assignors to Farbwerke Hoechst Aktiengesellschaft vormals Meister Lucius & Brüning, Frankfurt am Main, Germany
No Drawing. Filed Sept. 17, 1969, Ser. No. 858,888
Claims priority, application Germany, Sept. 20, 1968, P 17 93 461.1
Int. Cl. C07c *169/36, 175/00*
U.S. Cl. 424—241                                                     7 Claims

ABSTRACT OF THE DISCLOSURE

21 - (cyclobutyl - carboxylic acid) - esters of 3 - oxo-$\Delta^4$ - steroids useful as anti-inflammatory agents, and their manufacture by reaction of cyclobutane carboxylic acid chloride with corresponding 21-hydroxy-steroids.

---

The present invention relates to 21-esters of steroids of the general Formula I

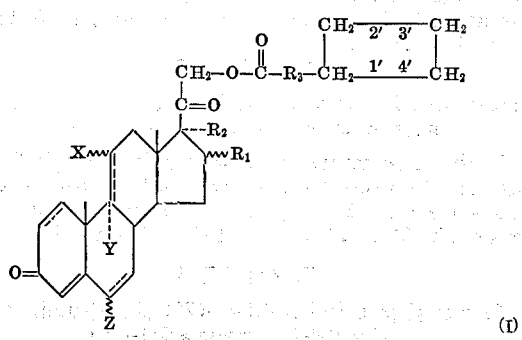

in which X represents 1 or 2 hydrogen atoms or the groups

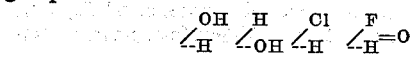

Y represents hydrogen or a fluorine atom,
Z represents hydrogen, fluorine or methyl,
$R_1$ represents hydrogen, methyl in $\alpha$- or $\beta$-position, fluorine or a methylene group which may be substituted by one or two fluorine atoms, and wherein in 1,2-, 6,7- or 9,(11) position additionally double linkages or oxido groups may be present,
$R_2$ represents hydrogen or hydroxy, and
$R_3$ is omitted or may represent a saturated or unsaturated alkylene radical containing 1 to 5 carbon atoms which may be branched, for example, —$(CH_2)_n$—, where $n$ is zero or one, or —CH=CH—, and the cyclobutyl radical may be substituted by methyl, chlorine or fluorine.

Furthermore the present invention relates to a process for the preparation of compounds of the general Formula I, which comprises reacting corticosteroids of the general Formula II

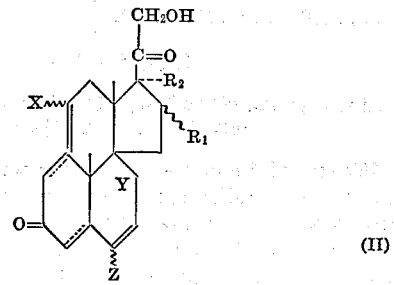

wherein X, Y, Z, $R_1$ and $R_2$ have the meanings given above, with a cyclobutane-carboxylic acid chloride of the general Formula III

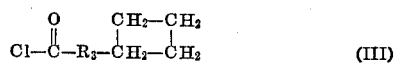

wherein $R_3$ has the meaning given above and the cyclobutane radical may be substituted by methyl, fluorine or chlorine and where one or several fluorine atoms, or an olefinic unsaturation in the 1,2- and/or the 6,7-position, may be subsequently introduced into the steroid radical, and/or a keto group in 11-position may be reduced.

The corticosteroids required as starting substances are known. There may, for example, be used: cortisone, hydrocortisone, Reichstein's substance S, prednisone, prednisolone, 6$\alpha$ - methyl - prednisolone, 16$\alpha$- or 16$\beta$ - methyl-prednisolone, 9$\alpha$ - fluoro- or 9$\alpha$ - chloro - prednisolone, 16 - methylene - prednisolone, 6$\alpha$,9$\alpha$ - difluoro - prednisolone, 6$\alpha$ - methyl - 9$\alpha$ - fluoro - prednisolone, 6$\alpha$-fluoro - prednisolone, 9$\alpha$ - fluoro - 16$\alpha$ - methyl - prednisolone, 9$\alpha$ - fluoro - prednisolone, 9$\alpha$ - fluoro - 16-methyl - prednisolone, 6$\alpha$ - fluoro - 16$\alpha$ - methyl - prednisolone, 6$\alpha$ - fluoro - 16$\beta$ - methyl - prednisolone, 6$\alpha$-fluoro - 16 - methylene - prednisolone, 6$\alpha$,9$\alpha$ - difluoro-16$\alpha$ - methyl - prednisolone, 6$\alpha$,9$\alpha$ - difluoro-16$\beta$-methyl-prednisolone, 6$\alpha$,9$\alpha$ - difluoro - 16 - methylene - prednisolone, 9$\alpha$ - fluoro - 6$\alpha$,16$\alpha$ - dimethyl - prednisolone, 9$\alpha$,16$\alpha$ - difluoro - prednisolone, 6$\alpha$,9$\alpha$,16$\alpha$ - trifluoro-prednisolone, 17$\alpha$,21 - dihydroxy - $\Delta^{4(5),9(11)}$ - pregnadiene - dione - (3,20); 17$\alpha$,21 - dihydroxy - 9$\beta$ - 11$\beta$-oxido - $\Delta^4$ - pregnen - dione - (3,20), 17$\alpha$,21 - dihydroxy-9$\alpha$,11$\beta$ - dichloro - $\Delta^{1,4}$ - pregnadiene - dion - (3,20), 17$\alpha$,21 - dihydroxy - $\Delta^{4(5),6(7)}$ - pregnadiene - dione-(3,20), desoxycorticosterone, corticosterone, 16$\alpha$ - methyl-corticosterone, 9$\alpha$ - fluoro - 16$\alpha$ - methyl - corticosterone, 6$\alpha$,9$\alpha$ - difluoro - 16$\alpha$ - methyl - corticosterone, 6$\alpha$-fluoro-16$\alpha$-methyl-corticosterone.

As acid chlorides there may be used, for example, the acid chlorides of 2',2',3',3' - tetrafluoro - cyclobutane-1' - carboxylic acid, 2',2',3',3' - tetrafluoro - cyclobutyl-1' - acrylic acid, 2' - chloro - 2',3',3' - trifluoro - cyclobutyl - 1' - acrylic acid, 2',2',3',3' - tetrafluoro - cyclobutyl - 1' - acetic acid, 2',2',3',3' - tetrafluoro - 1' - methyl-cyclobutyl - 1' - carboxylic acid, 2',2',3',3' - tetrafluoro-1' - chloro - cyclobutyl - 1' - carboxylic acid, 2',3',3' - trifluoro - 2' - chloro - cyclobutyl - 1' - carboxylic acid, 2',2' - dichloro - 3',3' - difluoro - cyclobutyl - 1' - acrylic acid. The acid chlorides are prepared according to known methods, for example by hydrolysis of the corresponding nitriles to acids and by converting the acid chloride in usual manner. These methods are described, for example, in Houben-Weyl, Methoden der organischen Chemie, 4th edition, vol. 5/3, "Halogenverbindungen Fluor und Chlor," 1962, pages 250–265.

According to the process of the invention the corresponding steroid alcohol is dissolved in an inert solvent, preferably in toluene, benzene, tetrahydrofurane, dioxane or diethylether, with addition of an organic base, such as pyridine, quinoline, triethylamine or dimethylamine. The bases just mentioned may also be used alone as the solvent, for example pyridine. The reaction with the corresponding acid chloride is carried out at temperatures in the range of from —40° C. to the boiling temperature of the solvent or of the mixture of solvents, preferably at temperatures from 0° C. to room temperature. The reaction time is 30 minutes to 24 hours, preferably 1 to 2 hours. Equimolar amounts of acid chloride are used, or an excess of up to 20 times this amount, preferably 1.2 to 2 mol-equivalents of acid chloride. For working up, the reaction mixture is poured on water which may contain sodium bicarbonate, whereupon the reaction products precipitate, in many cases only after standing for a longer time. Reaction products which remain oily are obtained by extracting with suitable solvents. If required, the reaction products may be purified by triturating them with the corresponding solvents, by recrystallization or by chromatography.

According to the process of the present invention, fluorine atoms may be introduced into the steroid radical at the positions designated as Y, Z, or R, using methods known in steroid chemistry, or olefinic unsaturations can be introduced in the 1,2- or 6,7-positions.

The products of the invention have valuable pharmacological properties. They are particularly distinguished by a surprisingly high antiinflammatory effect, especially in local application and their effectiveness is superior to that of known compounds, for example of 21-desoxy-6-methyl-9-fluoro-prednisolone. The products of the present invention are much more effective than are those of the corresponding steroid-21-alcohols used as starting products which have an antiinflammatory effect when not esterified.

For pharmacological testing of the local antiinflammatory effectiveness of the products of the invention, the "granuloma-Pouch-test" was used:

25 ml. of air were injected into the center of the back skin of female Spague-Dawley rats having an initial weight of from 150 to 200 g., and 0.5 ml. of 1% croton oil was introduced into this air sac. The air was withdrawn after 48 hours and the adhesion that had formed was detached after 72 hours.

In order to test the local effectiveness the substances were dissolved in 0.2 ml. of sesame oil and injected directly daily into the skin pocket. The animals are killed on the 8th day after formation of the skin pocket and the volume of the exudate which has formed in the pocket is measured. The amount of exudate of the test group is collected and compared with the amount collected from the control group. The suppression of the formation of exudate is given in percent. The superior antiinflammatory effectiveness is demonstrated on the products I and II of the present invention.

I=6α,9α-difluoro-16α-methyl-prednisolone-21-(β-(2'2', 3',3'-tetrafluoro-cyclobutyl-1'-)-acrylic acid)-ester
II=6α,9α-difluoro-16α-methyl-prednisolone-21-(2',2',3', 3'-tetrafluoro-cyclo-butyl-1'-carboxylic acid)-ester

TABLE

| | Number of animals | Amount of exudate given in ml. at a dosage of 0.5, 2.0, 10γ for each animal | | | Percent of suppression of amount of exudate at a dosage of 0.5, 2.0, 10γ for each animal | | |
|---|---|---|---|---|---|---|---|
| Control | 40 | | 7.6 | | | | |
| I | 40 | 2.6 | 1.1 | 0.4 | 66 | 86 | 95 |
| II | 40 | 3.1 | 1.6 | 0.4 | 59 | 79 | 95 |

Because of their good antiinflammatory effectiveness the products of the present invention may be used advantageously in veterinary and human therapy in the treatment of inflammatory dermatosis of different genesis. The products may be applied in the form of suspensions, ointments, creams, sprays, etc., for example in topical application in the form of crystalline suspensions, or, for example, by intra-articular injection.

The following examples illustrate the present invention but they are not intended to limit it thereto. The boiling points are not corrected and measured with the boiling point apparatus of Dr. Tottoli.

EXAMPLE 1

6α,9α-difluoro-16α-methyl-prednisolone-21-(2',2',3',3'-tetrafluoro-cyclobutyl-1'-carboxylic acid)-ester 200 g. of 6α,9α-difluoro-16α-methyl-prednisolone were dissolved in 2 ml. of dried pyridine and mixed dropwise, at 0° C., with a solution of 116 mg. of 2',2',3',3'-tetrafluoro-cyclobutyl-1'-carboxylic acid chloride in 2 ml. of absolute tetrahydrofurane. The whole was then stirred for 2 hours at room temperature. For working up, the solution was poured into an aqueous ice-cold sodium bicarbonate solution, extracted with chloroform, the extract was washed with salt water to neutrality, dried over sodium sulfate and evaporated to dryness in vacuo. The residue was taken up in equal parts of benzene and chloroform and filtered over acid aluminum oxide of activity stage III (Woelm). After eluation with benzene and subsequently with methylene chloride, the residue of the methylene fractions was triturated with a small amount of diethyl ether, mixed with petroleum ether, cooled to −20° C. and filtered off, 120 mg. of crystals were obtained. Melting point 173–176° C. (decomposition). IR: 3510, 3470, 1715–1725, 1660, 1620, 1180–1200 cm.$^{-1}$.

EXAMPLE 2

6α,9α-difluoro-16α-methyl-prednisolone-21-(β(2',2',3',3'-tetrafluoro-cyclobutyl-1')-acrylic acid)-ester 200 mg. of 6α,9α-difluoro-16α-methyl-prednisolone were dissolved in 2 ml. of dry pyridine and mixed dropwise, at 0° C., with a solution of 135 mg. of 2',2',3',3'-tetrafluoro-cyclobutyl-1'-acrylic acid chloride in 2 ml. of absolute tetrahydrofurane. The whole was then left for 2 hours at room temperature and treated as described in Example 1. 60 mg. of crystals were obtained (from ether/petroleum ether). Melting point 132° C. under decomposition. IR: 3460–3500, 1715–1730, 1660, 1620, 1190–1200, 1170 cm.$^{-1}$.

EXAMPLE 3

16α-methyl-9α-fluoro-prednisolone-21-β-(2',2',3',3'-tetrafluoro-cyclobutyl-1'-)acrylic acid)-ester In the same manner as described in Example 2, 500 mg. of 16α-methyl-9α-fluoro-prednisolone were reacted and worked up. 375 mg. of amorphous ester were obtained. IR: 3500, 1715, 1660, 1620, 1200 cm.$^{-1}$.

EXAMPLE 4

6α-methyl-prednisolone-21-(β-(2',2',3',3'-tetrafluoro-cyclobutyl-1'-)acrylic acid)-ester 500 mg. of 6α-methyl-prednisolone were dissolved in 5 ml. of dried pyridine and mixed dropwise, at 0° C., with a mixture of 600 mg. of 2',2',3',3'-tetrafluoro-cyclobutyl-1'-acrylic acid chloride and 2 ml. of absolute tetrahydrofurane, the whole was left at room temperature for ½ hour. The mixture was worked up and chromatographed as described in Example 1. The chromatographic fractions obtained with methylene chloride were treated with a small amount of animal charcoal, filtered, evaporated and crystallized with ether/petroleum ether in the cold. 260 mg. of crystals were obtained, melting point 245–250° C. (decomposition). IR: 3430, 3250, 1715–1735, 1645–1655, 1590, 1205, 1120 cm.$^{-1}$.

EXAMPLE 5

6α-fluoro-prednisolone-21-(β-(2',2',3',3'-tetrafluoro-cyclobutyl-1')acrylic acid)-ester 500 mg. of 6α-fluoro-prednisolone were dissolved in 5 ml. of dried pyridine and mixed with 0.6 g. of 2',2',3',3'-tetrafluorocyclobutyl-1'-acrylic acid chloride in 2 ml. of absolute tetrahydrofurane. The mixture was then left for ½ hour at room temperature. As described in Example 1, it was worked up and chromatographed, treated with charcoal and the crude product obtained was crystallized with ether/petroleum ether. 300 mg. of crystals were obtained. Melting point 205–212° C. (decomposition). IR: 3420–3480, 1715–1730, 1600–1610, 1620, 1205, 1120 cm.$^{-1}$.

EXAMPLE 6

16α-methyl-9α-fluoro-prednisolone-21-(2′,2′,3′,3′-tetra-fluoro-cyclobutyl-1′-carboxylic acid)-ester 500 mg. of 16α-methyl-9α-fluoro-prednisolone were dissolved in 5 ml. of pyridine and mixed with 0.7 g. of 2′,2′,3′,3′-tetrafluoro-cyclobutyl-1′-carboxylic acid chloride in 2 ml. of tetrahydrofurane and left for 1 hour at room temperature. As described in Example 1, the mixture was worked up, chromatographed, treated with charcoal and crystallized by triturating with ether/petroleum ether, 430 mg. of crystals were obtained (melting point 196–197° C., decomposition) and from the mother liquor another 50 mg. having a melting point of 175–180° C., decomposition. IR: 3500, 3480, 1720–1730, 1660, 1620–1600, 1205–1190, 1120 cm.$^{-1}$.

EXAMPLE 7

6α-methyl-prednisolone-21-(2′,2′,3′,3′-tetrafluoro-cyclobutyl-1′-carboxylic acid)-ester 500 mg. of 6α-methyl-prednisolone were dissolved in 5 ml. of pyridine, mixed with 300 mg. of 2′,2′,3′,3′-tetrafluoro-cyclobutyl-1′-carboxylic acid chloride and left for 1 hour at room temperature. As described in Example 1, the mixture was worked up, chromatographed, treated with charcoal and crystallized with ether/petroeum ether, 240 mg. of crystals were obtained, melting point 177° C., decomposition. IR: 3420, 1720–1735, 1645–1655, 1595, 1190–1205, 1125 cm.$^{-1}$.

EXAMPLE 8

6α-fluoro-prednisolone-21-(2′,2′,3′,3′-tetrafluoro-cyclobutyl-1′-carboxylic acid)-ester 500 mg. of 6α-fluoro-prednisolone were dissolved in 5 ml. of pyridine, mixed with 310 mg. of 2′,2′,3′,3′-tetrafluoro-cyclobutyl-1′-carboxylic acid chloride and left for 1 hour at room temperature. As described in Example 1, the mixture was worked up, chromatographed, treated with charcoal and crystallized with ether/petroleum ether. 300 mg. of crystals were obtained, melting point 172° C. IR: 3480, 1720–1750, 1660, 1630, 1205, 1125 cm.$^{-1}$.

EXAMPLE 9

Prednisolone-21-(2′,2′,3′,3′-tetrafluoro-cyclobutyl-1′-carboxylic acid)-ester 200 mg. of prednisolone were dissolved in 2 ml. of pyridine and mixed with 120 mg. of 2′,2′,3′,3′-tetrafluoro-cyclobutyl-1′-carboxylic acid chloride in 2 ml. of tetrahydrofurane, the whole was left for 2 hours at room temperature and worked up, chromatographed and crystallized with ether as described in Example 1. 120 mg. of crystals were obtained. IR: 3490, 1720–1750, 1600–1615, 1190–1210, 1135 cm.$^{-1}$.

EXAMPLE 10

Prednisolone-21-(β-(2′,2′,3′,3′-tetrafluoro-cyclobutyl-1′) acrylic acid)-ester 200 mg. of prednisolone were dissolved in 2 ml. of pyridine, mixed with 150 mg. of 2′,2′,3′,3′-tetrafluoro-cyclobutyl-1′-acrylic acid chloride in 2 ml. of tetrahydrofurane, left for 2 hours at room temperature and worked up and chromatographed as described in Example 1. 190 mg. of amorphous ester were obtained. IR: 3500, 1715–1730, 1620, 1200, 1130 cm.$^{-1}$.

We claim:

1. A 21 - (tetrahalocyclobutyl carboxylic acid) steroid ester of the formula

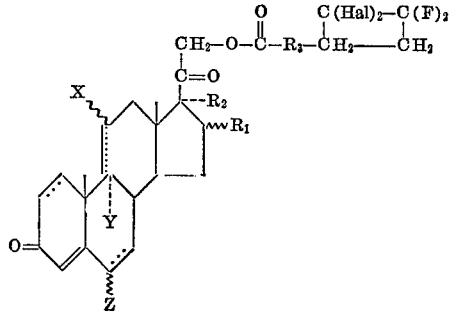

wherein:

X is hydrogen,

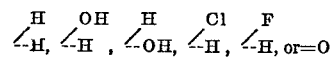

Y is hydrogen or fluorine;

Z is hydrogen, fluorine, or methyl;

$R_1$ is hydrogen, methyl in the α- or β-position, methylene, or methylene substituted with one or two fluorine atoms;

$R_2$ is hydrogen or hydroxy;

$R_3$ is —(CH$_2$)$_n$, where $n$ is zero or one, or —CH=CH—; and

Hal is chlorine or fluorine;

and corresponding esters having at least one additional unsaturation or oxido group in the 1,2-, 6,7-, or 9,(11)-position.

2. A steroid ester as in claim 1 wherein Hal is fluorine.

3. A steroid ester as in claim 1 wherein Hal and either or both of Y and Z are fluorine, and $R_1$ is methyl.

4. A steroid ester as in claim 1 wherein $R_1$ is methyl.

5. A steroid ester as in claim 1 wherein $R_3$ is —CH=CH—.

6. A steroid ester as in claim 1 wherein $R_3$ is —(CH$_2$)$_n$— and $n$ is zero.

7. A pharmaceutical preparation having an anti-inflammatory effect comprising, as the effective ingredient, a steroid ester as in claim 1.

References Cited

UNITED STATES PATENTS

| | | | |
|---|---|---|---|
| 3,033,863 | 5/1962 | Amiard et al. | 260—239.55 |
| 3,048,582 | 8/1962 | Joly et al. | 260—239.55 |
| 3,099,654 | 7/1963 | Joly et al. | 260—239.55 |
| 3,119,815 | 1/1964 | Amiard et al. | 260—239.55 |
| 3,161,663 | 12/1964 | Joly et al. | 260—397.45 |
| 3,165,542 | 1/1965 | Urech et al. | 260—397.45 |
| 3,067,217 | 12/1962 | Muller et al. | 260—397.45 |

LEWIS GOTTS, Primary Examiner

E. G. LOVE, Assistant Examiner

U.S. Cl. X.R.

260—239.55 R, 397.45, 397.47